United States Patent [19]
Galloway

[11] Patent Number: 5,470,544
[45] Date of Patent: Nov. 28, 1995

[54] SYSTEM FOR STEAM-REFORMING OF LIQUID OR SLURRY FEED MATERIAL

[75] Inventor: Terry R. Galloway, San Leandro, Calif.

[73] Assignee: Synthetica Technologies, Inc., Richmond, Calif.

[21] Appl. No.: 221,989

[22] Filed: Apr. 1, 1994

Related U.S. Application Data

[63] Continuation of Ser. No. 27,706, Mar. 8, 1993, abandoned.

[51] Int. Cl.[6] .......................................... A61L 2/06
[52] U.S. Cl. .......................... 422/213; 422/216; 422/219; 422/268; 422/769; 422/273
[58] Field of Search ...................... 422/216, 213, 422/219, 261, 268, 269, 273; 208/48 R, 49

[56] References Cited

U.S. PATENT DOCUMENTS 2,367,928  1/1945  Clark .................................. 422/216 X
4,863,702  9/1989  Galloway ................................. 422/189
4,874,587  10/1989  Galloway ................................. 422/189

OTHER PUBLICATIONS

Fed. Reg. No. 57, No. 105 Aug. 25, 1991, pp. 38558–38564, EPA Memorandum, Sep. 30, 1991, from Sylvia Lowrance, Dir. Solid Waste to Allyn M. Davis. Dir., Region 6.

Primary Examiner—James C. Housel
Assistant Examiner—Jan M. Ludlow
Attorney, Agent, or Firm—Coudert Brothers

[57] ABSTRACT

An apparatus for treating liquid or slurry having a heat treating zone through which is provided counter current flow of heated gas and independently moveable bodies through the heat treating zone in contact with a feed stream. A steam reforming detoxification reactor is also provided and gas is circulated from the heat treating zone gas outlet, through the reactor and to the heat treating zone gas inlet.

6 Claims, 8 Drawing Sheets

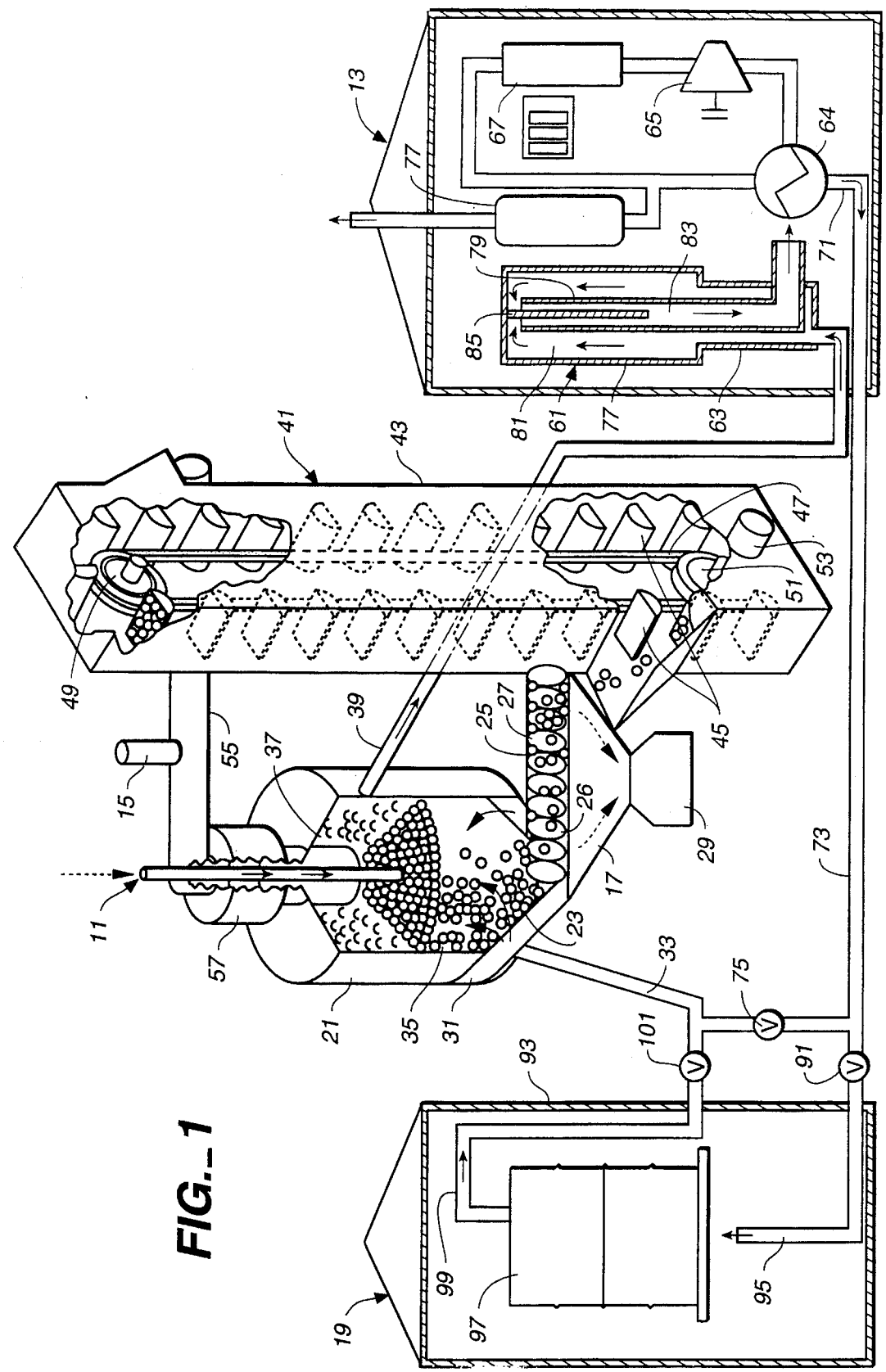

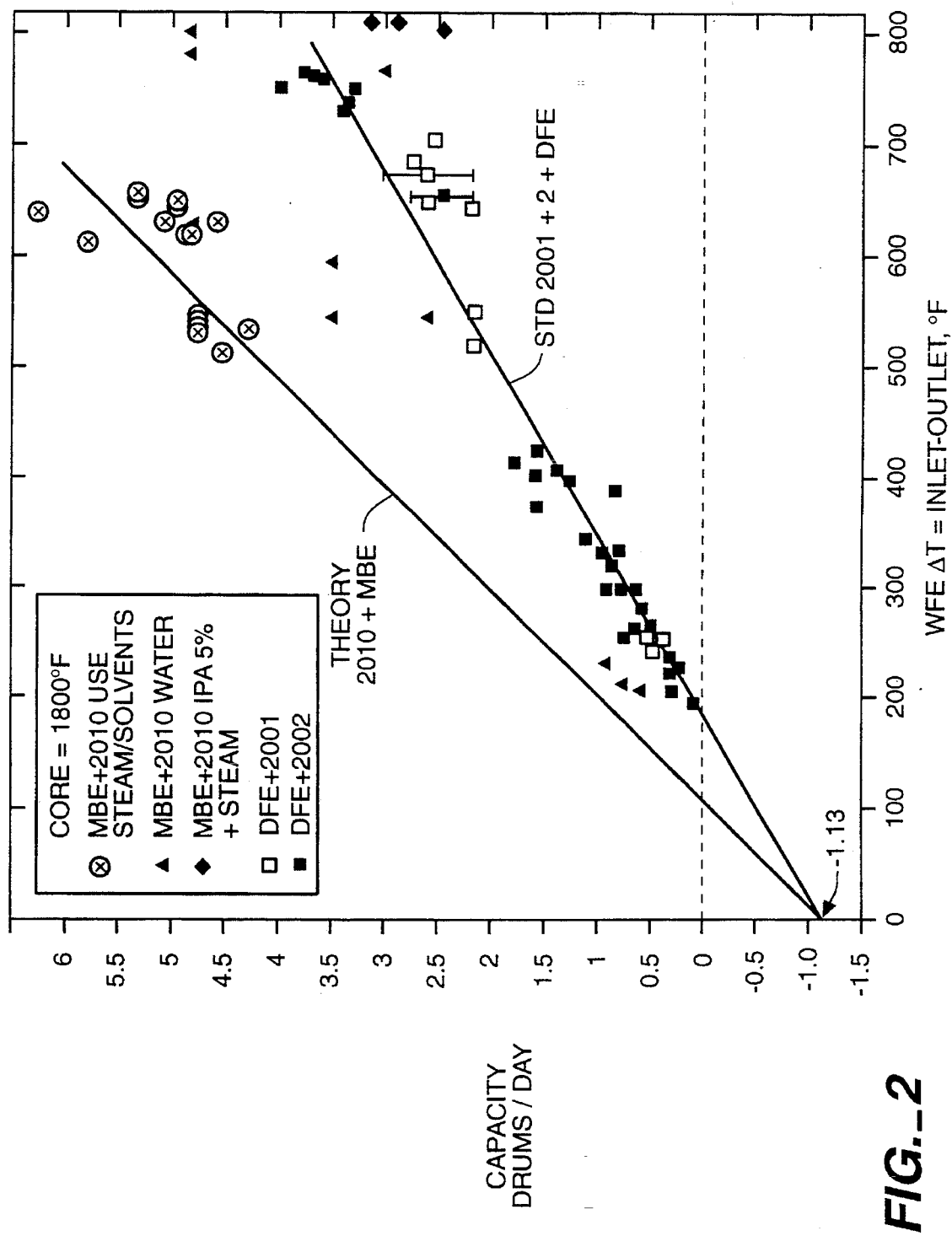
FIG._2

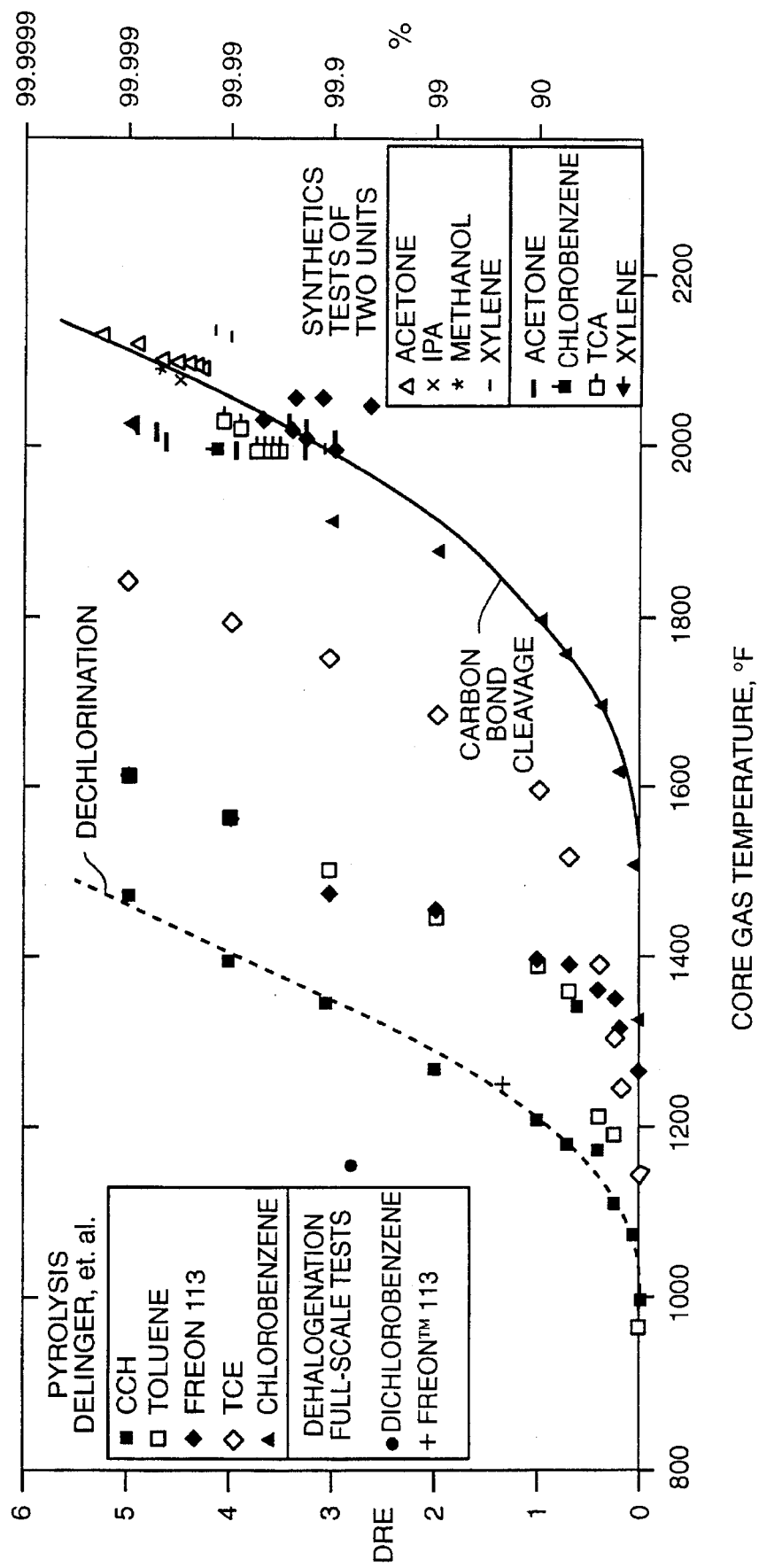
FIG._3

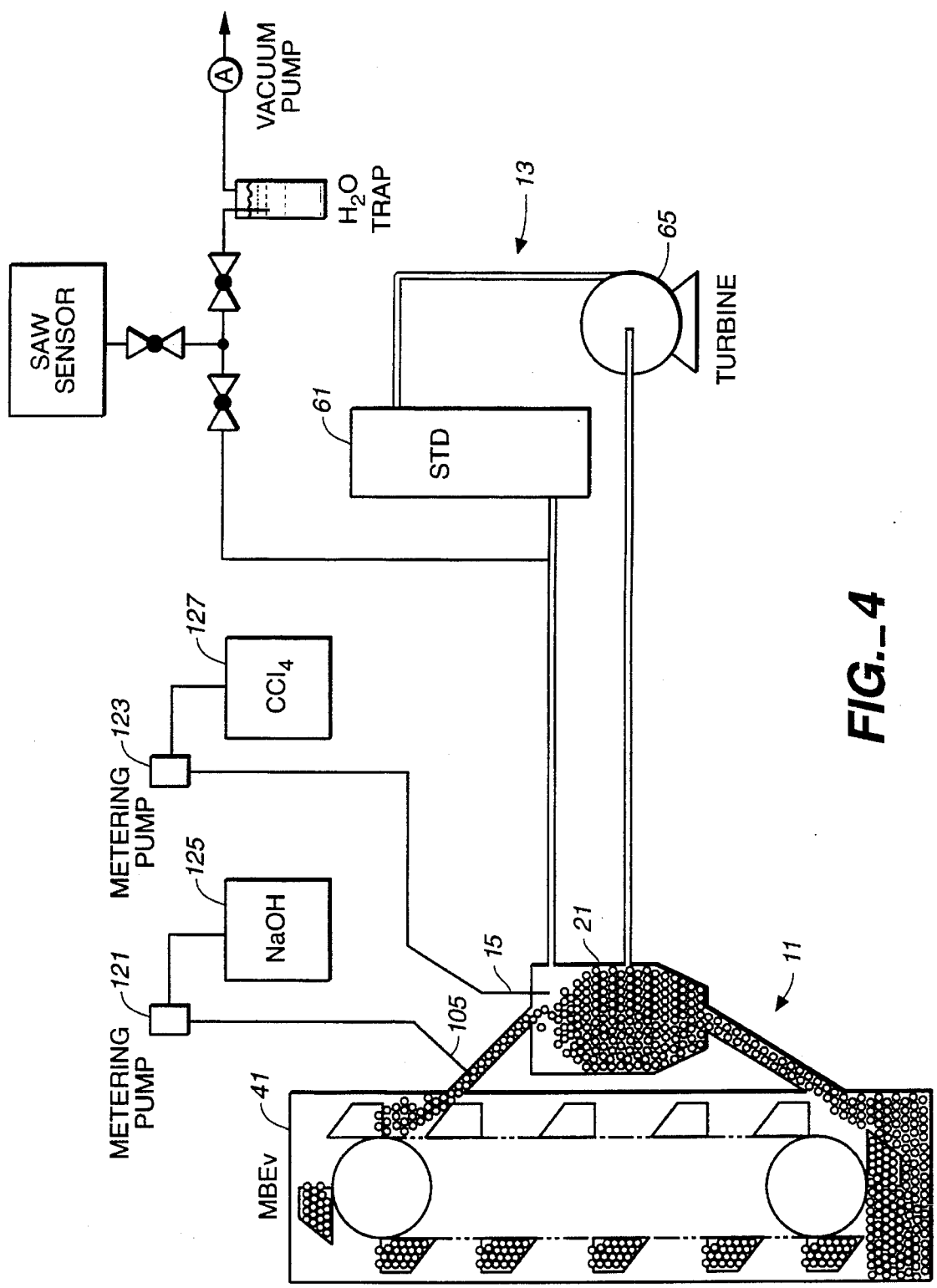
FIG._4

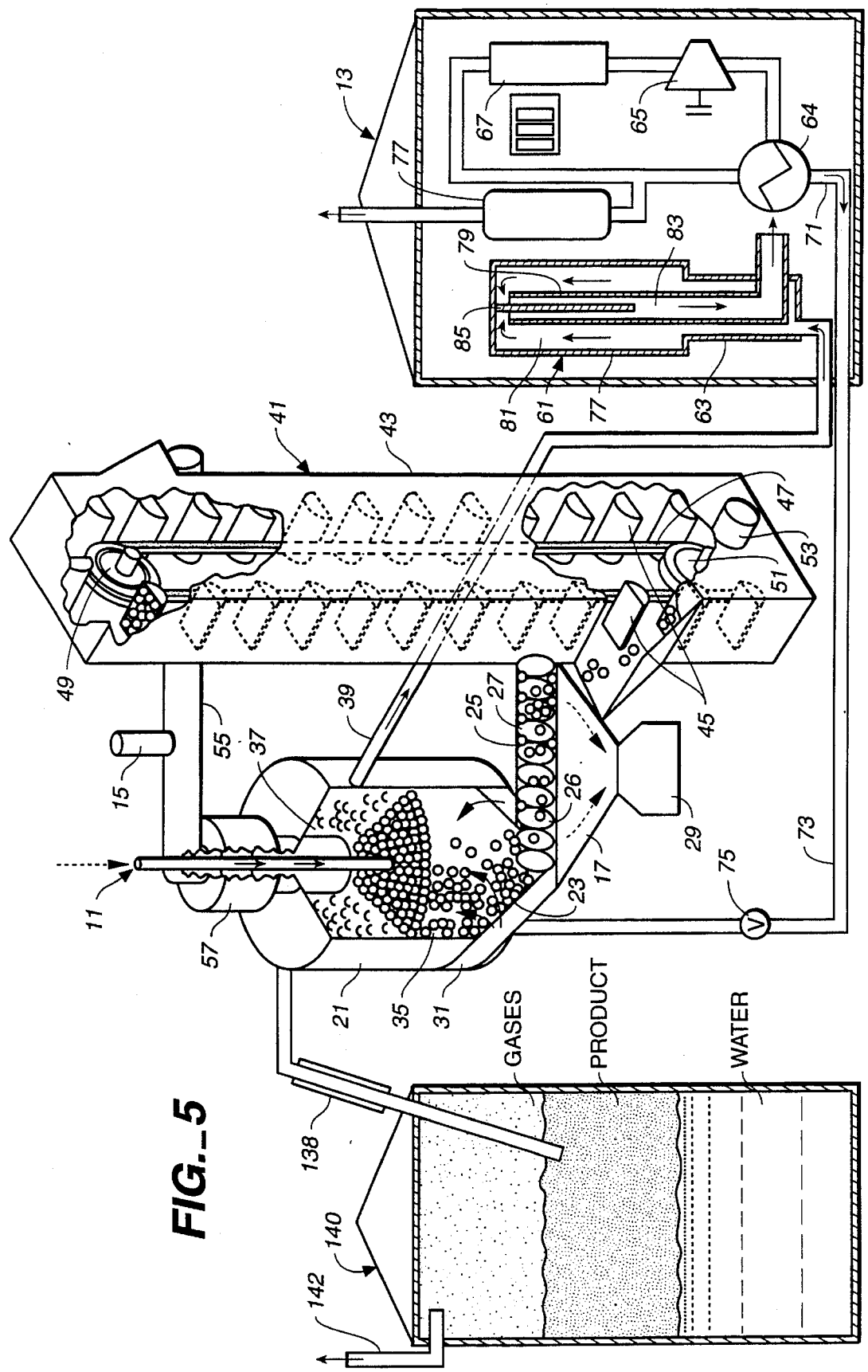
FIG._5

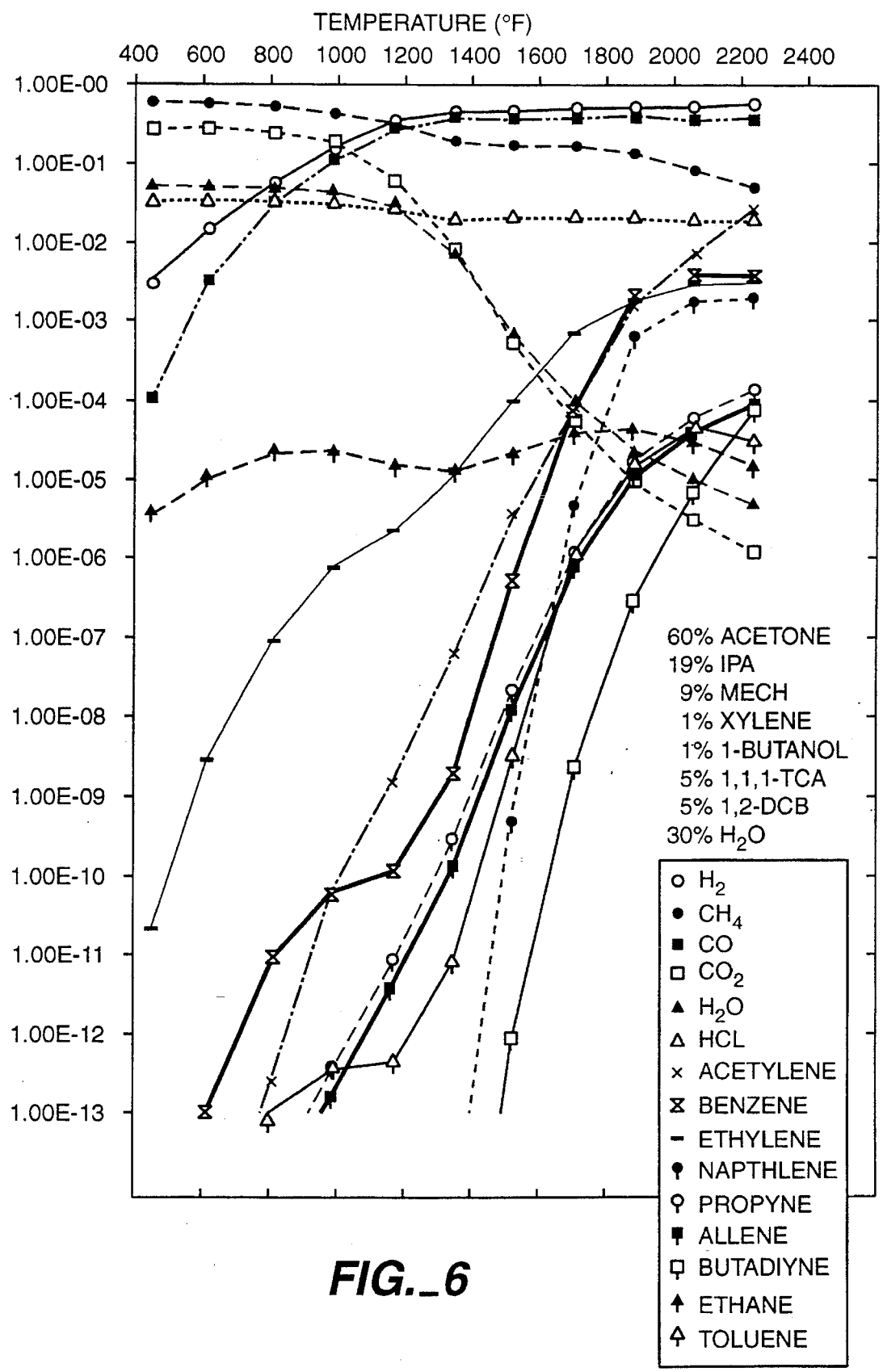
FIG._6

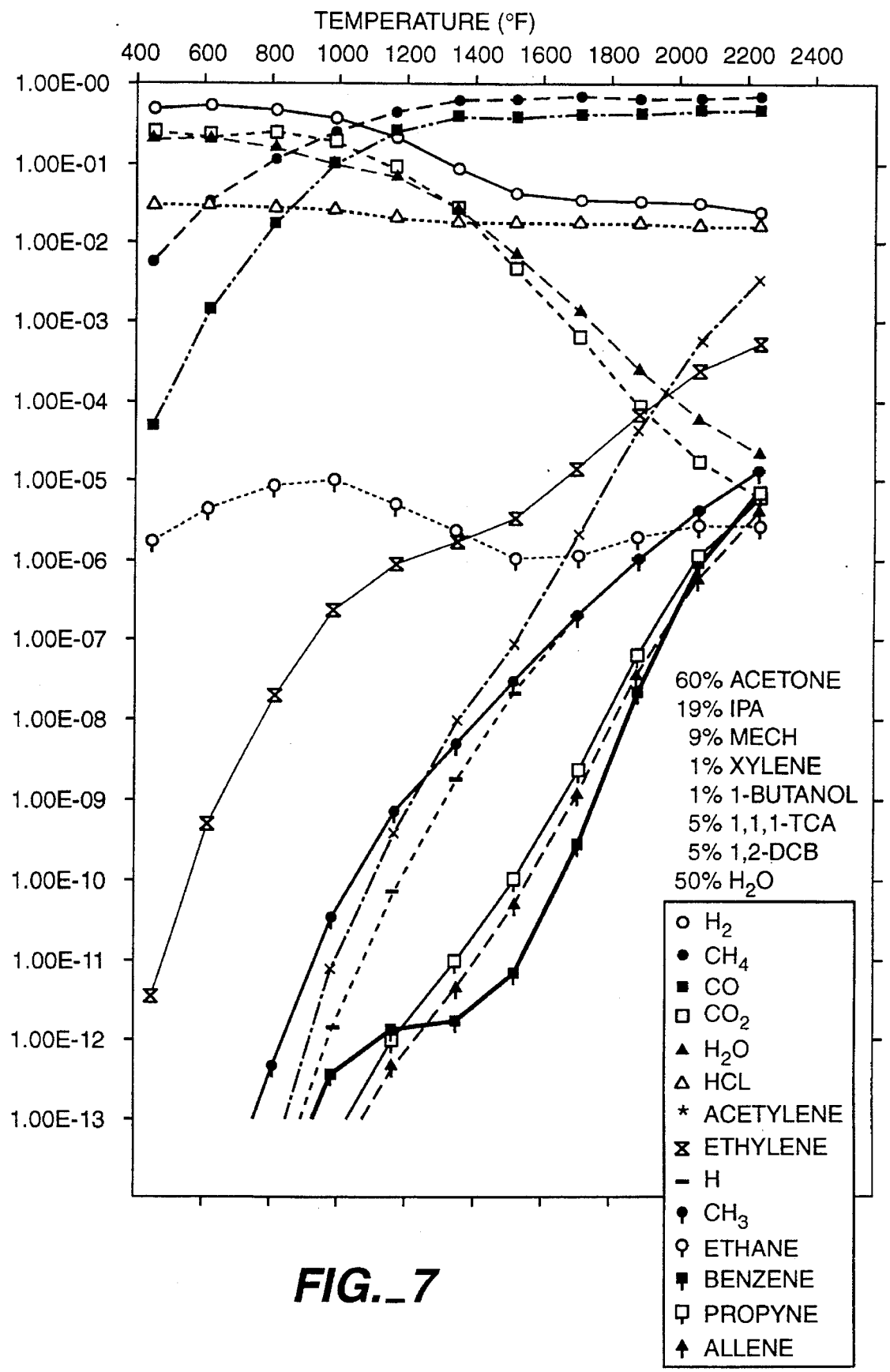
FIG._7

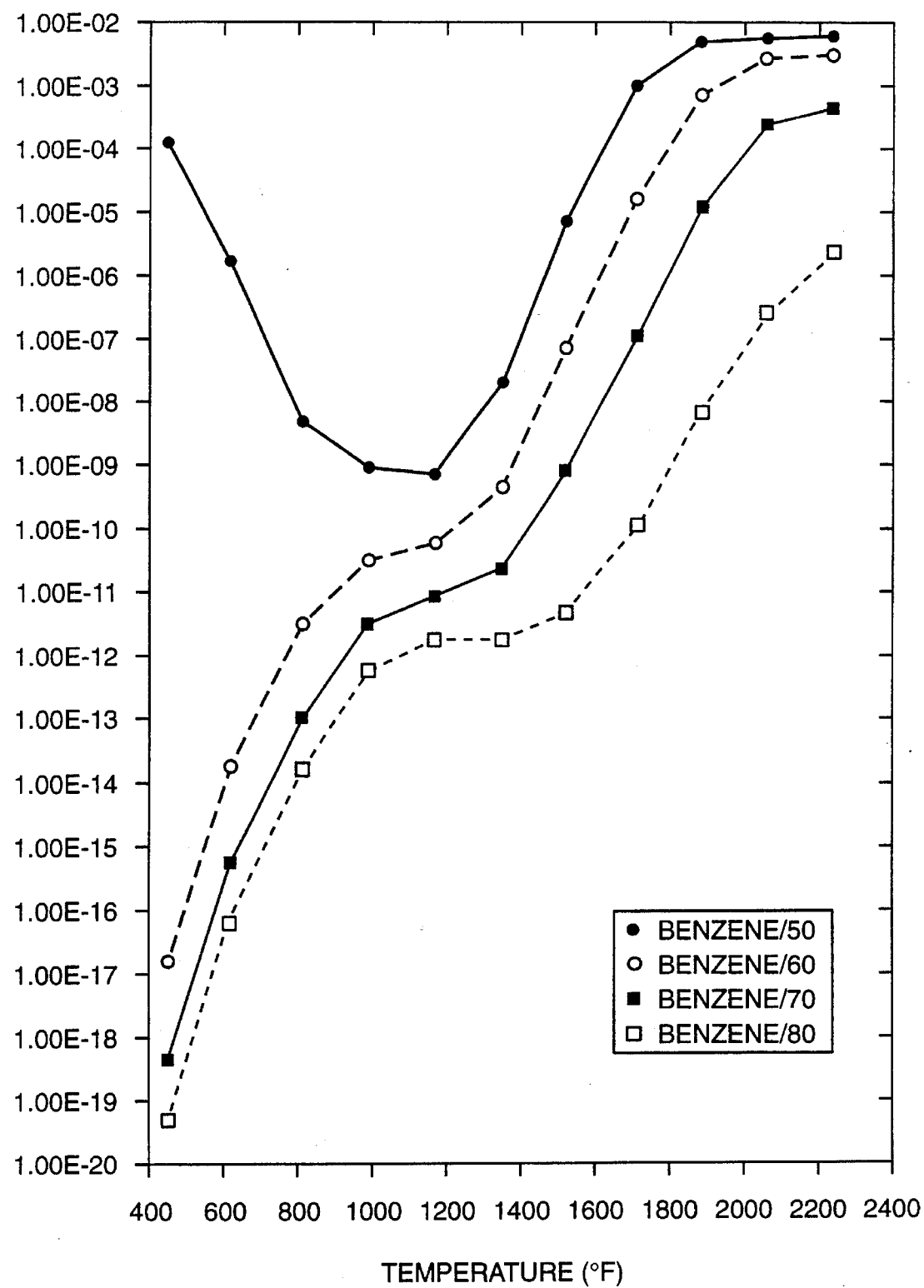
FIG._8

SYSTEM FOR STEAM-REFORMING OF LIQUID OR SLURRY FEED MATERIAL

This application is a continuation of application U.S. Ser. No. 08/027,706 filed Mar. 8, 1993 which is now abandoned.

This invention relates generally to the process of steam-reforming. More particularly, the invention relates to an improved system and method for the steam-reforming of liquid or slurry feed materials using steam-reforming detoxification chemistry.

BACKGROUND OF THE INVENTION

The detoxification of hazardous waste such as certain organic compounds, chemical and biological warfare weapons, and low and high level radioactive waste, is an ongoing problem. The shipment of such waste to processing or disposal sites creates significant danger of environmental release in the event of an accident. Accordingly, there is a need for methods and systems to efficiently dispose or reduce the volume of such toxic waste at the site where the waste is located.

The use of incinerators for burning hazardous waste is becoming unacceptable. Incinerators that meet current air pollution laws and have efficient operation tend to be relatively large and therefore may not be economically feasible for placement at facilities where toxic waste is generated. Moreover, incinerators are often difficult to control and create strong community and political ill-feeling. Perhaps more importantly, however, the incineration process may produce other toxic products which are themselves undesirable and which are difficult or impossible to eliminate.

In U.S. Pat. No. 4,874,587, issued Oct. 17, 1989 and assigned to the assignee of the present invention, a process and apparatus are described for hazardous waste detoxification which represent a significant improvement over incinerators. In the aforesaid patent, a reactor is described in which toxic destruction levels of 99.99% or more are achieved. The aforesaid process and apparatus are operated without air or free oxygen reaction and produce an effluent gas which is primarily comprised of carbon dioxide, hydrogen, carbon monoxide and water. The process and apparatus described in the aforesaid patent has been classified by the United States Environmental Protection Agency as "infrared heater" as differentiated from "incineration". Federal Register No. 57, Aug. 25, 1992, pp. 8558–38564, EPA memorandum Sep. 30, 1991 from Sylvia Lowrance, Dir., Solid Waste to Allyn M. Davis, Dir., Region 6.

A steam-reforming detoxification reactor operates to react a gaseous stream of toxic material with water in excess of the stoichiometric amount necessary to react with substantially all of the organic compounds in the stream of toxic waste. This reaction is carried out at a temperature in excess of about 1000° C. and results in an effluent gas stream of high temperature comprised primarily of carbon dioxide, water, and hydrogen but also containing low levels of carbon monoxide. The latter can be readily converted later to carbon dioxide by catalytic oxidation.

Since the principal reaction in a steam-reforming detoxification reactor occurs in the gas phase, the processing of waste where the waste material can be relatively easily gasified is fairly straightforward. For example, a system for vaporizing and gasifying toxic waste for feeding to a steam-reforming detoxification reactor wherein the toxic waste is liquid contained in a metal drum is shown and described in U.S. Pat. No. 4,863,702, issued on Sep. 5, 1989 and assigned to the assignee of the present invention. In the case of certain materials, such as viscous liquids and slurries, or more stable organic or inorganic compounds, however, conversion of the waste into a gaseous form for feeding to a steam-reforming detoxification reactor is not easily accomplished by the system described in the aforesaid patent.

Accordingly, it is a general object of this invention to provide an improved method and system for detoxifying toxic waste.

Another object of the invention is to provide an improved method for detoxifying liquid or slurry toxic waste which employs a steam-reforming detoxification reactor and which is adaptable to on-site applications.

Still another object of the invention is to provide an improved method and apparatus for detoxifying liquid or slurry toxic waste which operate efficiently and substantially completely.

A more general object of the invention is to provide an improved method and apparatus for processing liquid or slurry feed material to derive output product of an altered character.

Other objects of the invention will become apparent to those skilled in the art from the following description and accompanying drawings.

DESCRIPTION OF THE DRAWINGS

FIG. 1 is a schematic view of a system constructed in accordance with the invention for carrying out the method the invention.

FIG. 2 is a graph illustrating the improved performance of the system of the invention as compared with a system utilizing drum feed evaporation as described in U.S. Pat. No. 4,863,702.

FIG. 3 is a graph illustrating DRE versus core gas temperature for dechlorination and for carbon bond cleavage.

FIG. 4 illustrates a control system for use with the invention.

FIG. 5 illustrates the system of the invention as used for product recovery.

FIG. 6 is a graph illustrating the effect of thirty percent (30%) excess water in the moving bed evaporator portion of the invention for a variety of compounds.

FIG. 7 is a graph similar to FIG. 6 illustrating the effect of fifty percent (50%) excess water on reaction of a similar set of compounds.

FIG. 8 illustrates the effect of varying excess water in the moving bed evaporator from fifty percent (50%) to eighty percent (80%) excess on benzene formation in acetone-xylene mixtures.

SUMMARY OF THE INVENTION

The method and apparatus of the invention processes liquid or slurry feed material to derive output products of an altered character. A bed of a plurality of independently movable surface-presenting bodies is moved through an exposure region in a path of predetermined length while circulating a gas stream through the bed from a gas input region to gas output region in a direction substantially counter to the direction of movement of the bed. The gas stream comprises steam, hydrogen, carbon dioxide and carbon monoxide. The feed material is introduced to the moving bed for movement therewith through the path in the exposure region. The predetermined length of the path is selected to result in conversion of at least a portion of the feed material to an output product by reaction with the gas in the gas stream. The gas stream is, preferably, circulated from the gas output region to a steam-reforming detoxification reactor to react organic components in the gas stream with steam, and the effluent from the reactor is circulated to the gas input region.

DETAILED DESCRIPTION OF THE INVENTION

The general nature of the method and system of the invention may be more specifically discerned from FIG. 1. The system of the invention comprises two major components: a moving bed evaporator 11, and a steam-reforming detoxification reactor 13. The path of the feed material through the system is indicated by the dashed arrows and begins at the inlet tube 15 passing downwardly through the moving bed evaporator 11 to the collector 17 thereof. The solid arrows indicate the flow of the gas stream through the moving bed evaporator 11 to and from the steam-reforming detoxification reactor 13. A drum feed evaporator or autoclave 19 may also be employed as part of the system.

The moving bed evaporator 11 comprises a generally cylindrical tank or housing 21, the bottom of which communicates with the collector 17 through a screen 23. A tube 25 extends horizontally from the bottom portion of the cylindrical housing 21. The tube 25 contains an auger or screw 27 which is driven rotationally by a suitable driving mechanism and power source, not shown. Below said screw 27 there is a screen 26, through which particles abraded off the surface of the surface-presenting bodies. The collector 17 captures particulate material passing through screen 23 and transfers it to a particle reservoir 29.

Also provided at the bottom cylindrical housing 21 is a generally frusto-conical plenum 31. Hot gas enters the plenum 31 from a gas conduit 33. The cylindrical housing 21 is substantially filled by a plurality of surface-presenting bodies which form a porous bed 35. Gas from the plenum 31 circulates upwardly through the bed as shown by the solid arrows to an open space 37 above the bed 35. A gas conduit 39 communicates with the open space 37 and the gas, after passing upwardly through the bed 35 is removed from the open space 37 via the conduit 39 in the direction of the solid arrow.

The surface-presenting bodies which comprise the bed 35 are described in greater detail below. The screw or auger 27 moves these surface-presenting bodies from the bottom portion of he bed in the cylindrical housing 21. This causes the bed 35 to move continually downward.

The surface-presenting bodies comprising the bed 35 are returned to the top of the bed within the cylindrical housing 21 via a return device illustrated generally at 41. The return device in the illustrated embodiment comprises what is in the art known as a bucket elevator. The bucket elevator is contained within a housing 43 and comprises a plurality of buckets 45 which are suspended on a moving belt or chain 47. The chain is driven over an upper pulley 49 and a lower pulley 51 by a drive motor 53. The top of the buckets are open on the left hand side of the bucket elevator 41, turnover at the top as they pass over the pulley 49 and return downwardly on the right hand side of the illustrated device. The buckets rising in the bucket elevator pass the end of the screw or auger 27 to receive the surface-presenting bodies. These are carried upwardly in the apparatus and dump their contents into a conduit 55 at the upper end of the bucket elevator 41. The conduit 55 is inclined so that the surface-presenting bodies slide down the conduit and back into an intake duct 57 at the top of the cylindrical housing 21. The surface-presenting bodies, as shown in the illustrated embodiment, fan out at the lower end of the conduit 57 as they return to the upper end of the moving bed 35.

The gas conduit 39 extends from the cylindrical housing 21 to the steam-reforming detoxification reactor system 13. As illustrated schematically in FIG. 1, the reactor system 13 includes a reactor unit 61, the lower end of which comprises a heat exchanger 63. Heat is exchanged in the heat exchanger 63 between the cooler incoming gas and the hot effluent of the reactor. A further heat exchanger 64 is provided for receiving the hot effluent gas from the reactor unit 61 via the heat exchanger 63. A blower 65, connected on the output side of the reactor unit 61 maintains circulation in the reactor system 13. The outlet of the blower 65 passes through an optional sorber unit 67 which is provided to remove any particularized components entrained in the gas stream. The gas stream is then returned to the heat exchanger 64 via a conduit 69. After passing through the heat exchanger 64, a conduit 71 passes the hot gas to a further conduit 73. A conduit 73 is connected via a valve 75 to the conduit 33, thus returning the hot effluent gas from the reactor system 13 to the moving bed evaporator 11. Excess gas in the reactor 13 may be vented through a sorber unit 77 to atmosphere.

The steam-reforming detoxification reactor ,unit 61 is of the type generally described in U.S. Pat. No. 4,874,587, issued Oct. 17, 1989 as assigned to the assignee of the present invention. The process of steam-reforming detoxification involves the reaction, at high temperature, of a gas stream containing toxic material to be decomposed with water in the form of superheated steam. The water is present in excess of stoichiometry and results in the decomposition of 99.99% of organic compounds in the gas stream. The effluent gas stream is comprised principally of carbon dioxide, hydrogen and water with some carbon monoxide. The carbon monoxide may be detected and used as a measure of the extent of decomposition of organic compounds in the reactor. Detection of the amount of carbon monoxide in the effluent gas stream may be accomplished by any suitable means, such as electrochemical specific gas sensors or ultraviolet spectrophotometric monitors.

More specifically, the steam-reforming detoxification reactor unit 61 includes a substantially cylindrical outer housing 77 and a coaxial substantially cylindrical inner wall 79. The cylindrical wall 79 and the cylindrical housing 77 define an outer annular space 81. The cylindrical wall 79 further defines an inner space 83 which communicates with the annular space 81 through an opening provided between the upper end of the cylindrical wall 79 and the upper wall of the housing 7. An elongated U-shaped heating element 85 extends downwardly into the space 83 from a suitable heater power supply, not illustrated. A source, not shown, of superheated steam is connected to the reactor for adding water, as needed, to the reactor unit.

The heat exchanger 63 is preferably of the construction shown and described in U.S. patent application Ser. No. 685,532, filed Apr. 15, 1991, now abandoned which is incorporated herein by reference. Gas entering the heat exchanger passes from the heat exchanger upwardly into the annular space 81 of the reactor. Gas exits the space 83 of the reactor through the heat exchanger 63 to the further heat exchanger 64.

The optional drum feed evaporator 19 is connected to the gas conduit 73 via a valve 91. Gas from the conduit 73 passes into a sealed housing 93 via an inlet tube 95. The inlet tube 95 circulates hot gas through a drum 97, the contents of which are volatilized and passed via an outlet tube 99, through a valve 101, to the conduit 33.

In the preferred embodiment, the moving bed evaporator 11 has special materials of construction to permit high-temperature operation and materials capability for harsh chemical environments. The waste feed line (15) entering the top will allow thick, viscous, and solids-containing hazardous waste materials to be fed to the system. The vertical position of said feed line (15) can be adjusted to permit the proper gas contacting above the feed location to allow said gas to contact the surface-presenting bodies for accomplishing desired chemistry. The upper part of the housing 21 provides a surge capacity where the bodies can gather while being gravity lowered as the bottom of the moving bed 35 is removed by the auger (27). The inlet conduit 57 has some very special functions. First, the surface-presenting bodies are maintained in a column which allows for the bodies to be coated with the waste feed stream and pass out of the bottom of the inlet conduit 57 onto the larger bed expanse below. The feed line is positioned so that it is below the end of the conduit 57 near the top of the column of surface presenting bodies emerging from the conduit 57 so that the coated bodies roll across the larger bed surface in such a way that the waste is more uniformly spread and distributed throughout the bed 35 for better heat and mass transfer and gas contact as the bed is gravity lowered. The cavity (37) above this bed provides the disengaging region where the gas can pass upward and out of the bed to be removed by the exit pipe (39). Any inorganic portion of the waste which will not be either vaporized or steam-reformed within the housing 21, will coat the bed bodies and as the bodies rub against each other as they move downward, the friction removes this inorganic fraction as fine residue material which will fall off of the bodies through the screen 26 as the bodies are conveyed out of the bottom by the auger 27. Most of the residue leaves the spheres and falls into the spent residue base reservoir 29 as the bodies are forced across the screen and moved by the auger into the bucket elevator 41.

The hot gas enters the housing 21 through the feed pipe (33) that is configured as a tangential entry that centrifugally distributes that gas around the lower part of the bed 35 so that it can travel upward through the conic screen 32 up into the bed over a large area. As the hot gas passes upward through the bed, it contacts the cooler waste stream passing countercounterly downward. This action provides high rate heat and mass transfer from the hot gas to the cooler waste material coated onto the surface presenting bodies. As the gas passes upward through the bed it is cooled by giving up its heat into vaporizing the waste, around 300° C. (500° F.). As the waste coated bodies move downward in the main vessel, this waste experiences hotter and hotter gas. As the gas surrounding the waste-coated bodies becomes hotter, more waste is vaporized. At even higher temperatures, around 400° C. (750° F.), steam-reforming chemistry begins to further destroy the waste by forming the lighter volatile gases such as $H_2$, CO, and $CO_2$. These gases are carried upward through the bed by the bulk gas flow and leave the housing through the exit line 39.

The spheres are lifted by the bucket elevator 41 and dumped into the conduit 55 and then into the inlet 57. As an option, as the bodies travel down the angled conduit 55 into the housing 21, a pumped stream of reaction material, such as an alkali base, can be fed into the conduit from a pipe 105 (FIG. 4) in order to coat the bodies. These coated bodies are distributed in the chamber 57 before they pass into the main housing 21.

In a preferred embodiment, the moving bed evaporator 11 employs spherical surface-presenting bodies constructed out of 316-L stainless steel for the bed 35. Alternatively, ceramic alumina, titania, zirconia or other more exotic and expensive materials may be used for the bed bodies if desired. The shapes do not have to be spheres, as any other shape is possible that will still be movable in the system. The temperature of operation can be sufficiently high that significant steam-reforming chemistry occurs that will destroy organic materials that will not vaporize directly into a gas. The dynamics and friction between the bed bodies as they move downward is such that any of the hazardous waste inorganic fraction deposited or left behind as a residue from the evaporation process or from any coking chemistry becomes a fine powder and passes through the screen 26. The bodies are removed continuously from the bottom of the housing 21 by the auger screw 27. The size and operation of the moving bed evaporator is selected to be such that the evaporation rate produces a gas stream to the steam-reforming detoxification reactor 13 which matches the capacity of the reactor and optimizes the system overall economics. Particles abraded off of the bed spheres which are fine are entrained and carried upward with gas, while the larger particles move downward with the spheres and fall through the screen 26 into the reservoir 29 from which they are removed. Having the gas flow counter to the movement of the bed 35 reduces the dust carryover. The fine particles which are removed from the bodies of the moving bed by friction are entrained into the upward-moving gas phase but are recaptured by the incoming waste liquid or slurry.

The moving bed provides a predictable and constant residence time (not a wide distribution as in a fluidized bed) for better controlled organic volatilization of waste.

The surfaces of the surface-presenting bodies in the moving bed 35 can be catalytic in nature. The catalyst types can vary from nickel-based to promote steam-reforming at lower temperature, or special metals that promote dehalogenation. Many other specific reactions that can be enhanced or retarded by specific catalyst surfaces will be apparent to those skilled in the art from the teaching herein.

The surface-presenting bodies, (e.g. activated alumina or enhanced surface alumina) can be coated in exactly the same manner that commercial catalysts are prepared. In fact, in most cases commercial catalysts in the size range of 3 mm to 15 mm (⅛" to ⅝") would be satisfactory. Some extra care must be taken to insure that the catalytic coating be fired on the bodies with sufficient durability that it cannot be abraded away easily in the physical process of being moved through the housing 21 and returned to the top of the housing.

In additional to making the surfaces catalytic, the surfaces can be coated with various chemical reagents to effect or alter the chemistry. The surface of the surface-presenting bodies can be coated with chemical reagents, such as alkaline bases that can capture acid gases that are produced from the steam-reforming of halogenated wastes. This surface coating is removed in the bed 35 and leaves the unit through screen 26 and falls into chamber 29 by collection. For example, caustic which reacts with the acid gases, such as HCl, HI, HBr, $H_2PO_4$, $H_2S$, $HNO_3$, etc. can be used to coat the bodies. The reverse can be done also, such as using an acidic reagent coated on the bodies, such that any basic gases, such as $NH_3$ can be captured and removed. In addition, there is another wide variety of coatings that can be useful, such as sulfur, which will remove any mercury and wide range of other heavy metals. Another use is the selective removal of radioactive contaminants from a volatilized gas stream such that the radioactive components (e.g. technetium, ruthenium, cesium, iodine, etc.) are captured on the bodies and safely removed at the bottom of the housing 21 so that they can be put into "grout" or "vitrified glass" and safely disposed of. There is also a wide range of chemical reagents that can be added to the bed as free powder or particles of coarse dimensions in order to carry out reactions with the powder or particles.

In the preferred application, a specially designed moving bed evaporator has special materials of construction to permit high-temperature operation and materials capability with super-heated steam. The feed line entering the top allows thick, viscous, and solids-containing hazardous waste materials to be fed to the system. Any inorganic portion of the waste which will not be either vaporized or steam-reformed within the evaporator, will coat the bed bodies and as the bodies rub against each other as they move downward in the evaporator, the friction removes this inorganic fraction as fine residue material which will fall to the bottom through the screen 26. Most of the residue leaves the spheres as the spheres are forced across the screen into the elevator.

A simulated waste consisting of a mixture of 50% Iso-propyl alcohol and water was tested in the system of the invention. The results are shown in FIG. 2 as solid triangles on the plot showing capacity versus the $\Delta T$ across the inlet-outlet. Also shown for comparison are the data taken on the drum feed evaporator 19 connected to the reactor system 13, shown as open and closed squares.

A second demonstration test was performed for with a solvent mixture of 66.8% acetone, 19% isopropyl alcohol, 9% methanol, 1% each of xylene and $\eta$-butanol, and 1.6% each of 1, 1, 2-trichloroethylene, and dichlorobenzene (ortho & meta). This simulated waste was fed with 26% molar stoichiometric excess water (as steam) to achieve processing rates averaging 5.1 drums/day. A few tenths of percent of carbon were formed which were deposited and removed with Selexorb® HCl removal adsorbent.

The data are compared against the theoretical model for the evaporation process. This model is based on the steady-state heat balance between the incoming hot gas from the reactor unit and the heat needed to vaporize the incoming liquid waste. The model predicts a near-linear relationship between capacity and $\Delta T$ with the slope proportional to mass flow rate and heat capacity of the hot gas. The slope is somewhat decreased by the heat of vaporization of the liquid waste. This model predicts well our experimental performance data. Thus capacities of 5 drums per day are normally achievable with a $\Delta T$ around 590° F. for most organic solvent type waste streams.

When wastes contain large amounts of liquid water, the heat of vaporization is higher than normal organic wastes and would result in a lowering of capacity; however, the amount of water in the waste will reduce the amount of chemistry water that has to be added, so that the net result is that the capacity is lowered much less.

These interacting effects are complex, including the effects of the steam-reforming chemistry going on, so it is recommended that the capacity be determined preliminarily with each waste-type.

The system of the invention may be used to chemically react chlorinated fluorocarbons (CFCs) to eliminate chlorides and fluorides from being conveyed to the steam-reforming detoxification reactor 13 where they would cause severe corrosion. Tests with a pilot-scale unit indicate that 80–90% removal of halogens from the gas stream is possible. The halides are trapped in the feeder in the form of salts which are removable as solids.

The temperature of operation can be sufficiently high that significant steam-and thermal dehalogenation chemistry occurs to remove halogens to form hydrogen compounds that react and are neutralized by an alkali base surface coating to form a solid coating that can be abraded off the bodies and removed through the screen system.

The system of the invention is able to handle extremely high concentrations of chlorinofluorohydrocarbons, CFCs, in wastes. Since oxygen is absent, there are not detectible polychlorinated dioxins or dibenzofurans formed. The destruction of dichlorobenzene solvent, the EPA approved surrogate for simulating PCBs, used in these tests indicate that PCB destruction can be done entirely safely at high concentrations. Even when the CFCs are slightly radioactive, this chemical dehalogenation process can be used.

In processing halogenated waste material in the system of the invention, an alkali material, preferably sodium hydroxide, is introduced through the pipe 105 (FIG. 4). This coats the surface-presenting bodies with a layer of sodium hydroxide, which is "fired on" by the high temperature. The halogenated waste is fed through the inlet 15.

As the waste- and alkali-coated spheres move downward in the main vessel, the waste experiences hotter and hotter gas. And at these temperatures the first thermal dehalogenation chemistry starts to occur. As the gas surrounding the waste- and alkali-coated spheres becomes hotter, more waste is dehalogenated by both steam-reforming and thermal chemistry and more waste is vaporized. Now at the higher temperatures around 400° C. (750° F.) steam-reforming chemistry begins to further destroy the waste by forming the lighter volatile gases such as $H_2$, HX, CO, and $CO_2$. (HX stands for halogen acids, like a HCl, HI, HBr, and HF). All of these gases except HX are carried upward through the bed by the bulk gas flow and leave the main vessel through the exit line (17). The HX immediately reacts with the alkali to form alkali salt. This salt is removed from the bodies and passes out of the system through the screen 26 with the other solid inorganic residue.

Two kinds of small, bench-scale glassware experiments have been completed. First, small, bench-scale glassware tests were done with a variety of ceramic spheres treated and untreated with proprietary chloro-organic chemicals. These spheres were specially prepared to enhance the steam-reforming destruction of the chloro-organic chemicals to produce HCl, which is immediately chemisorbed or adsorbed onto the large reactive surface area available. The glassware test consisted of a cylindrical glass column where the chemical reactivity of these varieties of specially-prepared spheres could be measured as a moving front as a function of temperature to provide scale-up information for the bench-scale and ultimately the full commercial-scale. No breakthrough of HCl was detected to a high level of sensitivity until the bed was nearly saturated, at which time a sharp HCl is permanently captured onto these spheres so that it does not enter the process gas stream that is passing through the bed.

The next set of bench-scale experiments was done on a high temperature quartz, plug-flow reactor, through which a process stream consisting of super heated steam and dichlorobenzene was passed. These tests were done at a sequence of different temperatures from 250° to 1100° F. and varying residence times. The HCl produced from this dechlorination was continuously monitored during the tests. The dechlorination efficiencies were measured by a gas-chromatograph with a Flame Ionization Detector.

The results are shown in FIG. 3, where the Destruction and Removal Efficiency, DRE, is shown as a function of core gas temperature. The first dashed curve labeled "Dechlorination" is drawn through the $CCl_4$ pyrolysis data published by Dellinger, et al. with superimposed large solid dots showing our recent data on the dechlorination of o-dichlorobenzene, DBD, in the quartz reactor described above. The earliest results indicate an agreement between the dechlorination of $CCl_4$ and that of dichlorobenzene as to the temperature at which the chlorine atom is cleaved away from the carbon atom thus breaking the carbon-chlorine bond. By measuring the concentration of both benzene and dichlorobenzene in the quartz reactor product gases, the destruction efficiency can be determined.

The solid curve on the right portion of FIG. 3 is drawn through the combined data of Dellinger for dichlorobenzene and all other organics destroyed in commercial scale units. This curve represents the full destruction of the organic molecule by breaking both the chlorine bond but also the carbon bond and forming steam-reformed products of CO, $CO_2$, $H_2$, HCl, and $H_2O$.

These results show that high-temperature steam-reforming can dechlorinate the chloro-organics in a first step in the moving bed evaporator, capture the HCl to avoid corrosive problems, and then in second step destroy the remaining organics to a very high DRE level in order to achieve the required very low emissions.

The first set of tests used dichlorobenzene. The reaction temperature used was 1150° F. at the inlet, which was sufficiently high to achieve approximately 90% dechlorination of the DCB. The second test was with trichlorotrifluoroethane, (Freon™ 113). For a reaction temperature of 1250° F., 92% dechlorination and defluorination was attained.

The pilot scale equipment consisted of a steam boiler, an electric superheater, and a gas afterheater to provide steam at approximately atmospheric pressure and up to 1250° F. Waste is injected into the steam after the heaters and immediately before a dry scrubber. The pilot is comprised of a fixed bed of alumina spheres coated in a 25% sodium hydroxide solution. The entire bed of spheres can be continuously recirculated.

Superheated steam reacts with CFCs to strip off the halides in the form of HCl and HF. The carbon bonds are further broken down and transformed into simple organic compounds such as propane. The acids were shown to have reacted with the NaOH in the bed 13 to form salts, and the gas and residual steam pass through the bed 13 and were sampled for analysis. Analysis with wet pH paper showed no detectible acid gases.

For the dichlorobenzene test, these gases for sampled and run on a GC/FID to show the following composition: methane=0.25%, ethane=38 ppm, ethane=220 ppm, propane=33 ppm, propene=95 ppm, butane=15 ppm, butene=68 ppm, pentene=14 ppm, hexane=63 ppm, hexene=14 ppm, benzene=2.3 ppm and dichlorobenzene (DCB)=0.25 ppm. If we assume that all of the carbon in the original DCB is in all of the other compound fragments left from the destruction of DCB, the benzene equivalent of all of this carbon is 662 ppm. Thus, the DCB dehalogenation is >(1–2.3/662) or >99.65%. The mason that this estimate is a lower bound is that there could be some carbon accounted for in the unmeasured CO and $CO_2$. In the illustrated embodiment of FIG. 1, these organic fragments then pass into the reactor system for complete destruction.

For the CFC test, these gases for sampled and run on a GC/FID to show the following composition: methane=0.9%, ethane=0.12%, ethane=0.84%, propane=2.4%, butane=0.37%, pentane=2.4%, and trichlorotrifluoroethane (CFC)=0.62%. Similar to the above the CFC dehalogenation is calculated as >92%. Again, in the preferred application, these organic fragments then pass into the reactor system 13 for complete destruction.

By recirculation of the moving bed, salts formed in the reaction of HCl and HF with the NaOH can be removed, the spheres re-coated with caustic, and reintroduced into the top of the moving bed. What has been demonstrated is that the halogens can be stripped off of the organic halogenated organics, leaving behind organic fragments. The halogen acid, that has been formed from the released halogen radical reacting with the superheated steam, then is chemisorbed and reacted with the NaOH on the bodies to form inert, non-toxic halogen salts.

Moving Bed Evaporator Control System

Because neutralization of HCl in the moving bed evaporator is in essence an acid-base titration, a control system for the moving bed evaporator (MBE) has been designed and self-optimizing software that controls the system has been implemented on a 386 computer that controls the operation of the steam-reforming detoxification reactor. The system is illustrated in FIG. 4.

The Control System for the MBE assures (1) that chlorocarbons desorbed from Granular Activated Carbon (GAC) contained in drums place inside the Stream Detoxifiers (STD 13) Drum Feed Evaporator (DFE) will be almost completely decomposed during passage through the MBE, and (2) that essentially all of the HCl, released by decomposition in the MBE of chlorocarbons desorbed from the GAC, will be neutralized by the alkali base that is injected into the MBE 11.

The control system uses signals from two Surface Acoustic Wave 130 (SAW) chlorocarbon sensors, a pH and/or an HCl sensor, a pressure sensor, a flow sensor, and a CO sensor to control the rate at which chlorocarbons through inlet tube 15 and alkali base are introduced into the MBE. Temperature, pressure, $O_2$, CO, and HCl, respectively, are sensed as well as pH. These are used to control metering pumps 121 and 123 for sources of NaOH and $CCl_4$, 125 and 127, respectively.

Presently, HCl in MBE effluents is monitored by passing a portion of the MBE effluent stream through a water bath and measuring the pH of the bath water (the water is changed for every reading). The flow rate of into the MBE is then set at a rate that keeps the pH measurement slightly acidic (5<pH<7). Because of the logarithmic dependence of pH on HCl concentration, small changes in flow rate can produce large changes in measured pH. Therefore, the pH control algorithm changes flow rate in small incremental steps that are proportional to the pH offset from the specified set point. Small incremental adjustments will produce adequate control of the HCl neutralization in the MBE, because the large mass of the bed of ceramic spheres in the MBE causes MBE response times to changes in its inputs to be quite slow.

The alkali base/HCl neutralization is performed with HCl in slight excess in order to avoid build-up of alkali base in the MBE. The neutralization is followed by monitoring pH rather than gaseous HCl because the slow response of the HCl sensor presently used in the steam-reforming detoxification reactor does not permit the base metering device to be adjusted fast enough to control the base/HCl titration in the MBE. If a faster and high range gaseous HCl sensor can be obtained, control of the metering device by direct monitoring of gaseous HCl will be tried.

The rate of desorption of chlorocarbons from GAC needs to be controlled for two reasons: first to optimize the processing rate of the steam-reforming waste destruction system, and second, to protect the systems high temperature resistive heating elements from exposure to HCl concentrations greater than 2.0 weight percent in the gas stream heated by the elements. The rate at which chlorocarbons are desorbed from GAC in the Drum Feed Evaporator (DFE) is controlled by adjusting the amount of steam that passes through the DFE using pressure in the DFE, chlorocarbon concentration at the DFE outlet, CO in the steam-reforming detoxification reactor, and gas flow rate through the steam-reforming detoxification reactor as indicators of the amount of chlorocarbons vaporized in the DFE and decomposed in the MBE and the steam-reforming detoxification reactor.

The rate of desorption of chlorocarbons from GAC in the DFE is controlled as follows. The control system implemented on the steam-reforming detoxification reactor 386 computer seeks to maximize the rate of production of the principal steam-reforming product gas, CO, without exceeding either a specified operating pressure (normally minus four millimeters of mercury) or a specified $CCl_4$ concentration at the DFE outlet. The $CCl_4$ concentration at the DFE outlet is used because it provides faster response to changes in $CCl_4$ desorption in the DFE than would be obtained using the $CCl_4$ concentration at the MBE outlet.

The set point flow rate, $F_{Gas}$ DFE through the adjustable valve that controls steam flow rate of bulk gases and thus steam through the DFE is calculated using the following equations:

$$\frac{M_{HCl}}{M_{HCl} + {}^mGas} \leq 0.02$$

$M_{HCl} = $[chlorocarbon]$F_{Gas,DFE}$ ×(moles Cl/mole chlorocarbon)(36.5 g HCl/mole Cl)$(1-f_D)$ $M_{GAS} = F_{GAS,STD}(18P/RT)$ where $M_{HCl}$ is the mass flow rate of HCl through the TLD, $M_{GAS}$ is the mass flow rate of bulk gases (steam, CO, $CO_2$...) through the TLD, [chlorocarbon] is the chlorocarbon concentration measured by SAW1, $f_D$ is the fraction of the chlorocarbon desorbed in the DFE that decomposes in the MBE releasing HCl, $F_{Gas,STD}$ and $F_{Gas,DFE}$ are the flow rate of bulk gases through the steam-reforming detoxification reactor and the DFE, P and T are the pressure and temperature of the bulk gases in the steam-reforming detoxification reactor and R is the gas constant. Initially $f_D$ may be taken to be zero, which will produce a slow processing rate, since chlorocarbon decomposition and HCl neutralization in the MBE will be neglected. After satisfactory Control System performance has been demonstrated, it may be assumed that $f_D = $[chlorocarbon]$_{MBE}$/[chlorocarbon]$_{DFE}$ With this assumption, optimum processing rates may be obtained. In addition, the chlorocarbon concentration can be used to control the gas heater in the inlet line to the MBE.

When this is done, high chlorocarbon readings will cause the temperature of the gases flowing through the MBE to increase thereby promoting greater chlorocarbon decomposition in the MBE. Finally, the Control System as described achieves the flowing safety function: (1) if MBE operating temperatures are too low and therefore chlorocarbon concentrations in MBE effluents are too high, the SAW sensor on the MBE outlet line will detect the upset and the Control System will shot down the test; (2) if the chlorocarbon desorption rate in the DFE is too high, the SAW sensor at the DFE outlet will detect the upset and the Control System will decrease steam flow through the DFE by adjusting the adjustable valve thereby decreasing the rate of chlorocarbon desorption from GAC in the DFE; and (3) if the flow rate of the into the MBE is too low, the pH monitoring system will detect the upset and the Control System will increase the flow rate of the base metering device.

The system was tested by pumping $CCl_4$ into the Moving Bed Evaporator (MBE) while steam was flowing through the bed and measuring $CCl_4$ and HCl in the effluent stream from the MBE. By changing the temperature of the bed, $CCl_4$ decomposition and thus HCl generation could be varied. By adding alkali base to the bed, HCl released in the bed could be neutralized thereby decreasing HCl concentrations in the MBE effluent stream.

Sandia National Lab's Surface Acoustic Wave (SAW) chlorocarbon sensor was used to measure $CCl_4$ concentrations in MBE effluents. HCl in MBE effluents was detected by bubbling a portion of the effluent stream through water and measuring the pH change for the water.

High temperature steam, generated in the resistively-heated reaction chamber of the steam-reforming detoxification reactor, was pumped to the MBE by a turbine pump. Known flow rates of alkali base and $CCl_4$ were added to the MBE using metering pumps. The alkali base was injected into the sphere inlet arm of the MBE in order to coat the spheres with base before they rolled onto the top of the bed of spheres in the main body of the MBE. The $CCl_4$ was injected into the bed of spheres at its center through a tube that stuck down into the middle of the bed along the vertical axis of the body of the MBE. $CCl_4$ was measured by drawing MBE effluent into an evacuated sidearm located on the outlet pipe of the MBE, and then opening the sidearm to the evacuated SAW sensing chamber. The effluents in the sidearm passed through a water bubbler before they reached the vacuum pump. This caused most of the steam and all HCl in the effluent stream to condense in the bubbler which allowed HCl in the effluents to be detected by measuring the pH of the water bath (the bath water was changed for each measurement).

Previous bench-scale tests had shown that $CCl_4$ decomposition is not appreciable at temperatures below 400° C. Thus, by starting measurement before the bed could be heated to the temperature of the 500° C. steam flowing through it, initial measurements could be made when $CCl_4$ decomposition was minimal, and later measurements when $CCl_4$ decomposition was appreciable.

The $CCl_4$ concentrations that would have been measured in the MBE effluents had not $CCl_4$ decomposition occurred in the MBE were calculated as follows:

ppm $CCl_4 = 10^{+6}$ (moles $CCl_4$ min$^{-1}$/moles gas min$^{-1}$)

moles $CCl_4$ min$^{-1}$ = (ml $CCl_4$ min$^{-1}$)(density $CCl_4$)/(MW $CCl_4$)

-continued $$\text{moles gas min}^{-1} = (\text{Scfm gas})(28.3\ 1/\text{ft}^{-3})\frac{1\ \text{atm}}{(0.082)(298)}$$

The measurements made are presented in the following table:

| MBE Temp (C.) | | Flows (ml/min) | | CCl₄ Concentrations | | |
|---|---|---|---|---|---|---|
| inlet | outlet | CCl₄ | NaOH | measured | calculated | pH |
| 497 | 236 | 6.2 | 0 | 1200 | 1228 | 7–8 |
| 516 | 243 | 4.6 | 0 | 975 | 923 | 7–8 |
| 517 | 272 | 7.0 | 0 | 750 | 1393 | 4 |
| 522 | 297 | 8.0 | 50 | 458 | 1592 | 7 |
| 514 | 298 | 10 | 60 | 300 | 1990 | 7 |
| 501 | 283 | 20 | 60 | 281 | 3981 | 7 |

The first two sets of measurements in the table were taken early in the test, soon (steam 12:50, 14:16 and 14:35) after steam began to be passed through the MBE, when $CCl_4$ decomposition should have been minimal. The data indicate that, when the bed was at low temperatures near the injection point for $CCl_4$, $CCl_4$ concentrations measured by the SAW sensor agreed reasonably well with calculated concentrations as would be expected if only vaporization of $CCl_4$ was occurring. The third set of measurements shows that as soon as $CCl_4$ decomposition became significant, measured $CCl_4$ concentrations were substantially less than calculated concentrations and MBE effluents contained significant amounts of HCl. The fourth set of measurements shows that addition of NaOH to the bed caused the HCl released by $CCl_4$ decomposition to be completely neutralized. The fifth and sixth sets of measurements show that as bed temperatures increased, MBE effluent $CCl_4$ concentrations fell to near detection limits (200–300 ppm) without producing any increase in effluent HCl levels finally to 20 ml/min. The sixth set of measurements also shows that HCl neutralization is still quantitative even when at least 92 percent of the injected $CCl_4$ is decomposing [92–100(3981–300)/3981.

Although not quantitative, these measurements suggest (1) that $CCl_4$ will decompose extensively in the moving bed evaporator when the bed is at normal operating conditions (500 C gas inlet temperature; 300 C gas outlet temperature); (2) that at these conditions $CCl_4$ decomposition in the bed will be substantial (better than 90 percent); and (3) that neutralization of the HCl released by $CCl_4$ decomposition will be essentially quantitative so long as sufficient NaOH is injected into the bed.

Synthesis of Intermediate Compounds

Organic waste feed streams may contain some fraction of useful, lower molecular weight organics that, after separation or synthesis, can become one or more useful commercial products. Using halogenated organic wastes, the system of the invention may be used to remove the halogenated components of the organic wastes and leave behind a useful, non-halogenated organic. The separation function involves using the moving bed as a conventional fractionation column, with a liquid feed stream, top and bottom components, and side steam products at particular "plate" locations. Since the bed moves downward and thus can take solids-containing slurries, the solids can be removed as the solid bed bodies move out of the bed from the bottom in the described manner. The system is able to first pull the halogen (or other heterocyclic, such as sulfur, phosphorous, nitrogen, cyanide, arsenic, nitrites, etc.) off of the organic molecule, thus leaving the base, unhalogenated (non- heteroatom-substituted) molecule behind for further destruction or for possible recovery as on or more useful products.

The synthesis function involves using halogenated or heteroatom substituted organic wastes where the performs in the manner described removing the halogenated component of the organic wastes and leaving behind a useful, non-halogenated organic. This concept is applicable to other heteroatom substituted organics in addition to halogenated organics.

For example:

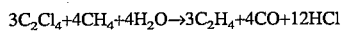

$3C_2Cl_4+4CH_4+4H_2O \rightarrow 3C_2H_4+4CO+12HCl$

This approach to synthesizing useful products starts with tetrachloroethylene waste and carries out a steam-reforming synthesis reaction with natural gas and steam to produce useful ethylene products and CO which is catalytically converted to $CO_2$. And the HCl is reacted with the caustic in the $H^2MBE$ operation to produce NaCl which is removed.

Solvent Recovery

The separation function involves using the moving bed as a conventional fractionation column, with a liquid feed stream, top and bottom components, and side stream products at particular "plate" locations. This bed configuration is illustrated in FIG. 5. In this example, a waste consisting of a mixture of xylene in resin paint waste is used. The paint contains terphenyl-based resin with a boiling point of 383° C. (721 ° F.), cresols at 200° C. (392° F.) and xylene at 139° C. (282° F.). The system is used to recover xylene as the product, destroy the resins, and separate the paint pigments for possible recovery. The hot gas stream from the reactor enters the bottom of the moving bed evaporator and passes very slowly upward through the bed. The cold liquid feed is pumped into the top of the bed through a long feed pipe so that the feed actually enters the packed bed area near the mid-height of the bed. The top of the bed is colder because of the heat of vaporization of the liquid feed. The temperature gradient is shown over the length of the bed. The physical height of the packed bed is determined once the height of a transfer unit (HTU) is known from the vapor flows and packing properties. Generally, a height of 3 meters or 12 feet is sufficient.

The top xylene product steam contains CO, $CO_2$, & $H_2O$, which separated from the xylene in a phase separator vessel 140, with the water in the bottom, the xylene in the top and the light gases are vented off via line 142. The mid-bed stream consisting of resins and cresols is sent to the reactor for destruction via line 39. And out of the bottom of the bed the bodies are coated with the pigments which are removed from the bed by the exit screw 27 conveying and abrading the spheres against a perforated screen 234 to remove the pigments and recirculate the spheres back up to the top of the bed.

In operation, the hot gas passes upward through the bed coated with alkali base. Again this hot gas contacts the cooler waste stream passing counterly downward as before. Even though these spheres are coated with alkali, this counter-current action still provides high rate heat and mass transfer from the hot gas to the cooler waste material coated on top of the alkali spheres. As the gas passes upward through the bed, it is cooled by giving up its heat into vaporizing the waste, around 300° C. (500° F.). As the waste and alkali coated balls move downward in the main vessel, the waste experiences hotter and hotter gas as before. And at these temperatures the first thermal dehalogenation chemistry starts to occur. As the gas surrounding the waste and alkali coated spheres becomes hotter, more waste is dehalogenated by both steam-reforming and thermal chemistry and more waste is vaporized. Now, at the higher temperatures around 400° C. (750° F.) steam-reforming chemistry begins to further destroy the waste by forming the lighter volatile gases such as $H_2$, HX, CO, and $CO_2$. (HX stands for halogen acids, like a HCl, HI, HBr, and HF). All of these gases except HX are carried upward through the bed by the bulk gas flow and leave the main vessel through the exit line. The HX immediately reacts with the alkali to form alkali salt. And it this salt that is removed from the spheres in the auger and passes out of the system with the other solid inorganic residue.

Out of the system from the disengagement region are passed through a condenser 138 from which the recovered liquid products are drained into the produce recovery tank. In this tank the gases rise to the top and are vented and the different density liquids are separated into the lighter hydrocarbon product and the heavier (i.e. water) layer.

Radioactive Organic and Nitrate Compounds

Organic contaminants and nitrates in underground storage Tank (UST) wastes have been destroyed by exposure to high temperature steam during bench tests with a quartz reactor and full-scale tests that used the steam-reforming waste destruction system of the invention. Thermal decomposition of nitrates at typical steam-reforming feed system temperatures (300 to 600 C) was also examined by Thermal Gravimetric Analysis (TGA).

Sixty-one million gallons of highly radioactive wastes (265 MCi) are stored in 177 underground storage tanks on the Hanford site in Washington state. The wastes contain large quantities of sodium nitrate, and smaller amounts of organic complexants (Na citrate, $Na_2$EDTA) and solvents ($CCl_4$, n-decane, tributyl phosphate), that were introduced into the wastes by PUREX processing of the original waste streams [R].

After retrieval from the tanks, Hanford remediation plans currently call for separation of the radioactive materials into a small quantity of high-level waste, which will be vitrified, and a large amount of low-level waste (sodium nitrate and other inorganic salts), which will be immobilized in grout in on-site vaults. The radioactive separations will be performed using solvent extraction or ion exchange processes. Because they interfere with both separation processes, the organic complexants and solvents in the wastes must be destroyed before either process is performed. Because nitrate is a hazard if it enters drinking water, it must be destroyed or the low-level grouted wastes will leach into groundwater and constitute a health hazard.

Organic wastes are gasified in either the drum feeder or the moving bed evaporator by exposure to steam at moderate temperatures (300–500 C). Heteroatoms in the gasified organic materials are released as mineral acids that will be immediately neutralized by the NaOH formed by reaction of the steam with the $Na_2O$ that is produced by thermal decomposition of the large amounts of sodium nitrate in the Hanford wastes. After gasification, the organic fragments are destroyed by exposure to 1100 C steam in the high-temperature reactor. Pressure increases due to gasification of organic materials are relieved by venting the excess gas to the atmosphere through an oxidative automobile catalytic unit that converts the CO and $H_2$ formed by the steam-reforming chemistry to $CO_2$ and $H_2O$.

Decomposition of $NaNO_3$ crystals with and without added heavy metal nitrates and of $NaNO_3$ dispersed on silica supports was examined using TGA. In ambient air, weight loss by $NaNO_3$ crystals is not detected below 600 C, and decomposition (loss of weight at a significant rate) is not appreciable below 725 C. Use of ambient air saturated with water vapor lowered this decomposition temperature from 725 C to 550 C.

Because alkaline earth and transition metal nitrates decompose directly to oxides releasing $NO_2$, while alkali nitrates decompose first to nitrites by release of $O_2$ and then to oxides by release of $N_2O_3$, catalysis of $NaNO_3$ decomposition by addition of heavy metal nitrates was examined. Addition of two percent $Ca(NO_3)_2$ or a mixture of other heavy metal salts found in UT wastes (iron, cadmium, chromium, lead, manganese, and mercury nitrates, sulfates, and/or phosphates) had no effect on the decomposition temperature in ambient air, indicating that non-alkali metal cation to not catalyze the decomposition of $NaNO_3$.

Dispersal of $NaNO_3$ on two types of silica beads that had quite different surface areas (55 and 243 $m^2/g$) led to complete decomposition in ambient air of the nitrate ions and lowered the decomposition temperature from 725 C to 280 and 260 C respectively. Thus, decomposition of $NaNO_3$ is strongly promoted by dispersal on a surface, although decomposition temperature is not strongly affected by surface area (degree of dispersal).

Bench-Scale Nitrate Decomposition Tests in Steam. In agreement with these results, only a twelve percent weight loss was attained when $NaNO_3$ crystals were exposed to 600 C steam in a quartz tube heated by a muffle furnace, while $NaNO_3$ coated on non-porous alumina spheres decomposed completely under the same conditions (nitrate concentrations on crushed spheres were 1425 mg/kg before exposure to steam and below the 5 mg/kg detection limit of ion chromatographic analysis after exposure).

Bench-Scale Organic Destruction Tests. Porous alumina spheres were soaked in a mixture of n-decane, tributylphosphate, $CCl_4$, and aqueous solutions of sodium citrate or disodium EDTA and then coated with a surrogate for UST single shall tank wastes prepared at Pacific Northwest Laboratory (PNL). Gasification of these organics was now examined by exposing the soaked, coated spheres to 600 C steam. After crushing, Total Organic Carbon (TOC) analyses of the soaked, coated spheres, before exposure to steam; 160 ppm TOC after). GC/MS analysis of a grab sample of the effluent steam stream showed that the concentrations of the starting organics in the effluent stream were below detection limits indicating that gasification had also led to destruction of the organics.

Full-Scale Nitrate Decomposition test. One hundred pounds of $NaNO_3$ dissolved in water was injected into a moving (recirculating) bed of ceramic spheres through which high-temperature steam was flowing (500 C at the bed inlet; 200 C at the bed outlet). Exposure to steam caused 92.2 percent of the nitrate to decompose and left a highly basic residue (wet pH paper registered pH 11 when in contact with the residue), presumably NaOH. Chemiluminescent analysis of grab samples of the Detoxifier effluent steam stream showed that it contained $NO_2$ (850 ppm) and NO (100 ppm), which appears to be consistent with the following reaction scheme:

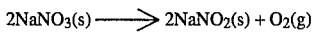

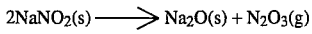

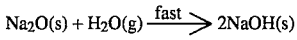

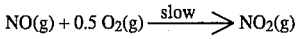

where the conversion produced by the first two reactions is about 92 percent, the third and fourth reaction are essentially quantitative, the conversion for the last reaction is about 80 percent, and the reverse of the last reaction is too slow to be significant at the experimental temperatures.

When summed, the above reactions yield $$2NaNO_3 + H_2O \rightarrow 2NaOH + 2NO_2 + 0.5O_2$$

This suggests that the molar rate of nitrate decomposition should have been about the same as the molar rate of NOx generation and that a small increase (about 0.5 percent) in bulk gas oxygen levels should have been observed. In fact, bulk gas oxygen levels increased by about 2 percent, and the molar rate of nitrate decomposition was about 0.7 moles per minute, while 950 ppm of NOx and a bulk gas flow rate of 35 cubic meters per minute gives a generation rate for NOx of only 0.03 moles per minute. This discrepancy may be explicable if $NO_2$ and NO are being converted either to $N_2O$ or $N_2$ in the high-temperature reactor of the Detoxifier. If conversion to $N_2$ is occurring, then the amount of oxygen released would have produced a increase of about two percent in bulk gas oxygen levels, which agrees well with the experimental data.

Full-Scale Organic Destruction Test. Finally, 50 lbs of the PNL UST surrogate waste was prepared using a recipe supplied by PNL and then was spiked with $CCl_4$, n-decane, and tributylphosphate (the recipe contained sodium citrate, and disodium EDTA). When the spiked waste was pumped onto a bed of Raschig rings in a 55 gallon drum through which high-temperature steam was flowing (440 C inlet, 315 C outlet), before and after TOC analyses of the spiked waste showed that 97.5 percent of the organics had been gasified out of the waste, and before and after nitrate analyses showed that 96.9 percent of the nitrate ions had decomposed.

Conceptual Field-Operable Steam-reforming System. Since the large-scale tests were performed using the drum feed system (the 50 lb surrogate waste test) of the Synthetica's high-temperature team reforming waste destruction system, these results suggest that the organic contaminants and the nitrates in Hanford UST wastes can be efficiently destroyed by exposure to high-temperature steam using existing commercial equipment that has a unit processing rate of two tons of aqueous slurried waste per day.

Surface Area Tests. The first tests were done on a small scale quartz reactor consisting of a 50 MM (2 inch) diameter quartz tube placed within a standard clamshell furnace. Inside this quartz reactor, there was placed a stainless steel boat in which a small sample of the nitrite waste stimulant (for the Hanford UST tanks) was placed. Tests were done with a simple pool of free liquid and heat only, but the conversions were very low because of surface reaction product build-up and halting of the chemistry. Next, this liquid pool was used with steam, and the conversion rates were a little higher. Then the boat was filled with porous ceramic spheres with a diameter of 4 mm (¼ inch) that were coated with the nitrate liquid. These spheres had a surface to volume ratio of 1500/meters. With this surface area combined with both heat and steam, the conversions were in excess of 90%.

This method is superior to simply placing the nitrate liquids in a drum, since in this case the surface area exposed to very small—around 0.2 m². Even nozzles spraying the nitrate into a drum cannot produce enough surface area, because of the problems of the nitrate liquids plugging the nozzles. But the surface area of the surface presenting bodies in the moving bed evaporator may be as much as 2000 m². Note, that this is 10,000 times larger than is possible in the drum.

TGA Nitrate Decomposition Experiments. Decomposition of $NaNO_3$ crystals with and without added heavy metal nitrates and of $NaNO_3$ dispersed on silica supports was examined using TGA. In ambient air, weight loss by $NaNO_3$ crystals is not detected below 600° C., and decomposition (loss of weight at a significant rate) is not appreciable below 725° C. Use of ambient air saturated with water vapor lowered this decomposition catalysis of $NaNO_3$ decomposition by addition of heavy metal nitrates, which decompose directly to oxides and $NO_2$, was examined. Addition of two percent $Ca(NO_3)_2$ or a mixture of other heavy metal salts found in UST wastes (iron, cadmium, chromium, lead, manganese, and mercury nitrates, sulfates, and/or phosphates) had no effect on the decomposition temperature of $NaNO_3$ in ambient air, indicating that non-alkali metal cations (not catalyze the decomposition of $NaNO_3$.

Dispersal of $NaNO_3$ on silica beads having quite different surface areas (55 and 243 m²/g) led to complete decomposition in ambient air of the nitrate ions and lowered the decomposition temperature from 725° C. to 280° and 260° C. respectively. Thus, decomposition of $NaNO_3$ is strongly promoted by dispersal on a surface, although decomposition temperature is only very slightly affected by increasing surface area (degree of dispersal).

Nitrate Decomposition in Steam. Decomposition of $NaNO_3$ crystals in 600° C. steam in a quartz tube heated by a muffle furnace gas is not effective (only a 12% weight loss), while $NaNO_3$ coated on non-porous alumina spheres decomposes completely under the same conditions (nitrate concentrations on crushed spheres were 1425 mg/kg before exposure to steam and below the 5 mg/kg detection limit of ion chromatographic analysis after exposure).

Destruction of Chemical Weapons

When used to destroy chemical warfare agents, the system of the invention consists of a three-step process. Agent is evaporated in a feed system. Next the vaporized agent is decomposed in a moving bed evaporator (hereafter MBE), where the acid gases released (HF, $H_3PO_3$) are neutralized by slurried alkali base, and finally the remaining organic fragments are destroyed (DRE>99.9999%) by steam-reforming at high temperature (≈1300° C.) in the STD. Within the WFE, the warfare agent is vaporized by superheated steam. In the MBE, steam-reforming chemistry starts to occur at temperatures from 400° to 700° C. The steam-reforming of warfare agent forms CO, $CO_2$, $H_2O$, $H_2$, HF, $H_3PO_3$ and a small amount of $CH_4$. After capture of acid gases by the slurried base, the remaining gases are heated to higher temperatures and mixed with excess superheated steam as they are pulled into the main reactor where any remaining organic fragments are completely destroyed.

Unlike incineration, the chemistry used in the system of the invention does not involve combustion. The main chemical reactions, here illustrated for di-isopropyl fluorophosphate, can be considered to be reduction by steam:

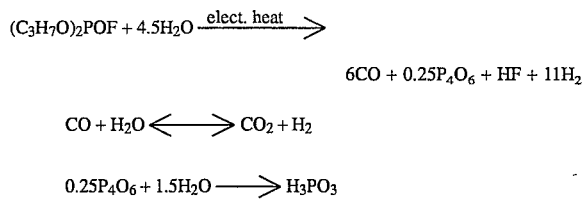

$$CO + H_2O \longleftrightarrow CO_2 + H_2$$

$$0.25P_4O_6 + 1.5H_2O \longrightarrow H_3PO_3$$

Steam-reforming chemistry begins in the moving bed evaporator, continues as the gas temperature increases along the path through the bed to the high-temperature reactor system. Because residence times in the high temperature reaction chamber of the STD are long (~1 second per pass, with three passes through the system before venting being typical of normal operation), steam-reforming chemistry approaches thermodynamic equilibrium. More importantly, because steam-reforming reactions are highly endothermic, steam-reforming equilibria lie far toward products which assures high destruction efficiencies.

A small portion of the CO, $CO_2$, $H_2O$, & $H_2$ gases formed in the main reactor are split off the main flow and fed to the catalytic CO Converter. In the CO Converter, excess air is added to convert these gases to $CO_2$ & $H_2O$, as per the following reactions:

$$2CO + O_2 \rightarrow 2CO_2 + HEAT$$

$$2H_2 + O_2 \rightarrow 2H_2O + HEAT$$

$$CH_4 + 2O_2 \rightarrow CO_2 + 2H_2O + HEAT$$

The heat of reaction released in the CO converter is recovered and reused in the steam-reforming process. The CO Converter catalyst also destroys any residual traces of reactants or byproducts left in effluents.

Table 2 presents the destruction efficiencies (DREs) measured for a range of organic chemicals during a lengthy series of full-size STD destruction tests conducted under a California State Grant Program(5).

TABLE 2

SUMMARY OF TEST RESULTS

| COMPONENT (POHC) | STD CORE °F. | SYN-FEED % | STD EXIT ppm org. | STD EXIT ppm CO | DRE LEVEL, % |
|---|---|---|---|---|---|
| Acetone | 2100 | 9 | 37 | 4500 | 99.9963 |
| Acetone | 2100 | 10 | 14 | 5000 | 99.9976 |
| Acetone | 2100 | 26 | — | 11400 | 99.9980 |
| Acetone | 2100 | 40 | — | 11700 | 99.9951 |
| Acetone | 2100 | 55 | — | 12078 | 99.9949 |
| Acetone | 2100 | 60 | — | 2930 | 99.9061 |
| Acetone | 2100 | 60 | — | 3054 | 99.9651 |
| Acetone | 2100 | 60 | — | 3123 | 99.9768 |
| Acetone | 2015 | 66 | — | — | 99.9951 |
| Acetone | 2024 | 66 | — | — | 99.9955 |
| Acetone | 2170 | 66 | — | — | 99.9995 |
| Acetone | 2160 | 66 | — | — | 99.9986 |
| Acetone | 2100 | 68 | — | 2930 | 99.9878 |
| Acetone | 2100 | 68 | — | 163 | 99.9988 |

TABLE 2-continued

SUMMARY OF TEST RESULTS

| COMPONENT (POHC) | STD CORE °F. | SYN-FEED % | STD EXIT ppm org. | STD EXIT ppm CO | DRE LEVEL, % |
|---|---|---|---|---|---|
| Acetone | 2100 | 68 | — | — | 99.9982 |
| Acetone | 2100 | 68 | — | — | 99.9976 |
| Carbon Tetrachloride | 2100 | 33 | 21 | — | 99.9952 |
| Chloroform | 2100 | 33 | 7.8 | — | 99.9992 |
| Dichlorobenzene | 2000 | 1 | — | 2930 | 99.9650 |
| Dichlorobenzene | 2015 | 1 | — | — | >99.9775 |
| Dichlorobenzene | 2024 | 1 | — | — | >99.9510 |
| Dichlorobenzene | 2170 | 1 | — | — | >99.9700 |
| Dichlorobenzene | 2160 | 1 | — | — | >99.9101 |
| Dichlorobenzene | 2050 | 5 | — | 3123 | 99.9768 |
| Dichlorobenzene | 2050 | 5 | — | 3054 | 99.9672 |
| Dichlorobenzene | 2050 | 5 | — | 2930 | 99.9904 |
| Isopropanol | 2100 | 16.4 | 3.7 | 5000 | >99.9990 |
| Isopropanol | 2100 | 19 | — | 11700 | >99.9978 |
| Isopropanol | 2100 | 19 | 6 | 4500 | >99.9994 |
| Isopropanol | 2100 | 19 | — | 12078 | 99.9977 |
| Methanol | 2100 | 10 | — | 1170 | 99.9972 |
| Methanol | 2100 | 35 | — | 11500 | >99.9996 |
| Methanol | 2100 | 100 | — | 11100 | >99.9996 |
| Methylene Chloride | 2100 | 33 | 16 | — | 99.9978 |
| Methyl Isobutyl Ketone | 1800 | 25 | <10 | — | >99.99 |
| 1,1,1-Trichloroethane | 2090 | 1 | — | — | 99.9661 |
| 1,1,1-Trichloroethane | 2000 | 1 | — | — | 99.9916 |
| 1,1,1-Trichloroethane | 2050 | 1 | — | 3123 | 99.9730 |
| 1,1,1-Trichloroethane | 2050 | 1 | — | 3054 | 99.9799 |
| 1,1 1-Trichloroethane | 2050 | 1 | — | 2930 | 99.9879 |
| 1,1,1-Trichloroethane | 2015 | 1 | — | — | 99.9775 |
| 1,1,1-Trichloroethane | 2024 | 1 | — | — | >99.950 |
| 1,1,1-Trichloroethane | 2170 | 1 | — | — | >99.9700 |
| 1,1,1-Trichloromethane | 2160 | 1 | — | — | >99.9101 |
| Xylene | 2100 | 0.8 | — | 4500 | >99.9815 |
| Xylene | 2000 | 1 | — | 2930 | 99.9622 |
| Xylene | 2050 | 1 | — | 3123 | 99.8838 |
| Xylene | 2050 | 1 | — | 2930 | 99.9751 |
| Xylene | 2015 | 1 | — | — | 99.9930 |
| Xylene | 2024 | 1 | — | — | 99.9926 |
| Xylene | 2170 | 1 | — | — | 99.9933 |
| Xylene | 2160 | 1 | — | — | 99.9907 |

NOTE: All results were obtained from tests conducted on full-size STD units. The >symbol indicates that residual reactant concentrations were below analytic detection limits. Thus, the DRE cited above is a lower bound. So that in the case of xylene, the true DRE for xylene is greater than 99.99815%, but can only be determined using a higher initial xylene concentration in the fee, a longer sampling time on the adsorption tube, or a smaller amount of sorbent inside the sorbent tube (smaller tubes are not available commercially).

b. Thermodynamic Equilibrium and Kinetics

Thermodynamic equilibrium is approached in any high temperature organic destruction process, whether it is be steam-reforming or by combustion incineration. Incineration tends to form very toxic chlorinated dibenzo-p-dioxins or dibenzofurans, whereas the Synthetica steam-reforming chemistry tends to form light olefins and aromatics.

Steam-reforming chemistry significantly reduces toxic emissions below those characteristic of incinerators. Since the reactor is electrically heated and no air-fuel combustion occurs, none of the typical combustion-type pollutants such as NOx, SOx, particulate, etc. are formed. Typical incinerator emissions such as the polychlorinated dioxins, furans, and benzopyrenes are reduced to below analytical levels of detection. Toxic halogenated aromatics found in incinerator emissions are not detected in effluents, since steam-reforming chemistry cleaves off halogen atoms from aromatic rings. There is also experimental evidence of aromatic dealkylation and alkylisomerization reactions. Thus, the destruction mechanism for aromatics is first cleaving halogens, then aromatic alkyl substituent groups, and finally ring cleavage. Some alkyl group translocation and ring additions occur. This is illustrated by the formation of trace amounts of toluene, benzene, styrene, naphthalene, dichlorobenzens, and benzyl chloride during the destruction of xylene by steam-reforming. Using high resolution GC/MS for aromatics, levels of benzene, toluene, xylenes, naphthalene, styrene, acenaphthenes, etc. are typically near or below detection limits.

Gibbs Free Energy global minimization methods may be used to predict the equilibrium composition of steam-reforming chemistry from the initial bulk composition of the reactant mixture. Gibbs Free Energy minimization code has been run for many of the syn-feed mixtures tested. FIGS. 6 and 7 present results for a mixture of 68% acetone, 19% isopropyl alcohol (IPA), 9% methanol (MeOH), 1% xylene, 1% butanol ($C_4H_9OH$), 1% trichloroethane (TCA), and 1% dichlorobenzene (DCB) with a molar excess of steam of 30 and 50% respectively.

Comparison of FIGS. 6 and 7 shows that with increased steam, benzene and naphthalene levels are decreased 1000 fold at 1200° C. (2200° F.). In FIG. 8 the effect of increasing steam on benzene formation for the acetone-xylene waste surrogate is presented. The figure shows by-product formation can be suppressed by moderate increases in steam concentrations. Results to date suggest that this is true for all by-products. Therefore, for a given waste stream, an optimum amount of steam can be chosen that will suppress by-product formation.

The table below presents Arrhenius data for the destruction of trichloroethane (TCA) by steam-reforming over a rhodium catalyst to illustrate the dependence of the destruction efficiency on temperature. The data were measured during bench-scale experiments. The data show that for TCA, DRE increases by more than 2 nines for every 100° C. increase in operating temperature.

| Steam-reforming DESTRUCTION EFFICIENCY (DRE) FOR TRICHLOROETHANE $\ln(1-DRE) = -kt = -Ate^{-E/RT} = 4.86 \times 10^5 \, te^{8740/T}$ | |
| --- | --- |
| T (K) | DRE (t = 0.1s) |
| 900 | 94.7% |
| 1000 | 99.96% |
| 1100 | 99.999998% |

Formation of explosive mixtures is prevented, because process operating conditions do not produce explosive mixtures. Alarms are set at 3% oxygen in order to prevent any build-up of oxygen from in-leakage. In fact, the process normally operates at below 0.3% oxygen, a level too low to support combustion or explosions. The maintenance of a negative pressure on the waste processing side of the system insures against waste stream leakage outward and allows real-time in-leak detection by constant monitoring of oxygen levels.

DREs for warfare agents of at least 99.9999% (6-nines) are expected based on experimental results for other organics. Thus, if 1500 lbs of warfare agents are processed by one STD in one day and the STD achieves a 99.9999 (6-nines) DRE for agent, since the carbon bed and CO converter capture an additional 99% of the residual agent that passes through them, agent emissions will be <0.0001 mg/$M^3$, which is lower than the required stack emissions limit of 0.0003 mg/$M^3$.

DREs of 99.999999% may be attained if maximum operating temperatures of 1500° C. (2700° F.) are used (at these temperatures additional special ceramic components already designed and tested would be used in the high temperature reactor). If a DRE of 99.999999% (8 nines) is achieved, the CO converter and carbon bed would provide an additional margin of safety.

Gas Emissions and Solid Residues

The following is a summary of principal emissions in effluents. These emission levels were measured for the following typical halocarbon solvent moisture (66% acetone, 32% xylene, 1% 1,1,1 TCA, and 1, 2 DCB) with the system operating without any air emission abatement devices, hence the high level of $H_2$.

| | | | |
| --- | --- | --- | --- |
| Carbon dioxide | 80% | Water | 15% |
| Hydrogen | 1.4% | Light hydrocarbons | 3.3% |
| Carbon monoxide | 2,000 ppm | $NO_x$ | 0.3 ppm |
| Particulate Mat., PM10 | <background | Hydrogen chloride | 4 ppm |
| 1,2 Dichlorobenzene | 4 ppm | 1,1,1 TCA | 3 ppm |
| 2,3 7, 8 TCDD | <0.3 ppt | 1,1,2 TCA | <0.3 ppm |
| Acetone | 30 ppm | Xylene | 30 ppm |
| Benzene | 9870 ppm | Toluene | 300 ppm |
| Ethylbenzene | <40 ppm | Styrene | 40 ppm |
| Benzyl Chloride | 40 ppm | Naphthalene | 40 ppm |

Three abatement devices would be used when warfare agent is being destroyed a CO catalytic converter that removes >97% of the organics that pass through it, an activated carbon bed that removes >95% of the organics and volatile inorganics that pass through it. Together the carbon bed and CO converter reduce STD reduce these organic emissions by an additional factor of 500. Thus, even if a DRE of only 99.9999% (6-nines) is attained for warfare agent, the stack emission limit for agent of 0.0003 mg/$M^3$ will easily be met.

The warfare agents, GA, GB, VX, and Mustard Gas, contain nitrogen, phosphorous, sulfur, and fluorine heteroatoms. The table below shows the warfare agent, its empirical formula, and the principal (greater than 1 ppm) detoxified products that are expected to be formed by the heteroatoms according to thermodynamic equilibrium predictions. Since steam will convert $P_4O_6$ to $H_3PO_3$ and COS to $CO_2$ plus $H_2S$, all undesirable reaction products are expected to be acidic and therefore to be removed from the steam stream by slurried base in the having bed evaporator.

| CW AGENT | FORMULA | DETOXIFIED PRODUCTS |
| --- | --- | --- |
| GA | $C_5H_{11}N_2O_2P$ | $N_2$, $P_4O_6$ |
| GB | $C_4H_{10}F_1O_2P$ | HF, $P_4OP_6$ |

-continued

| CW AGENT | FORMULA | DETOXIFIED PRODUCTS |
|---|---|---|
| VX | $C_{11}H_{26}N_1O_2P_1S$ | $N_2$, $H_2S$, $NH_3$, COS, $P_4O_6$ |
| Mustard | $C_4H_8Cl_2S$ | $H_2S$, COS, HCl, $S_2$ |

What is claimed is:

1. Apparatus for processing liquid or slurry feed material to derive output products of an altered character, comprising:

means defining a heat exposure region having a predetermined length, said exposure region defining means including a heated gas input opening and a gas output opening and an inlet and an outlet;

means for directing a bed comprising a plurality of independently movable surface presenting bodies through said heat exposure region;

means for circulating a heated gas stream through said bed in said heat exposure region from said heated gas input opening to said gas output opening in a direction substantially counter to the direction of movement of said bed;

means for introducing a feed material to said bed for movement therewith through said exposure region for reaction with the heated gas stream circulating through said bed to derive output products of an altered character;

a steam-reforming detoxification reactor; and, means for circulating the gas stream from said gas output opening to said steam-reforming detoxification reactor to react organic components in the gas stream with steam and for circulating the effluent from said reactor to said heated gas input opening.

2. Apparatus according to claim 1 including means for withdrawing different output products from said exposure region at different locations therealong.

3. Apparatus according to claim 1 wherein the surfaces of said surface presenting bodies include a catalyst.

4. Apparatus according to claim 1 wherein the surfaces of said surface presenting bodies include activated alumina.

5. Apparatus according to claim 1 wherein said exposure region defining means are oriented such that the direction of movement of said moving bed has a substantially vertical downward component, and wherein said apparatus further includes means for removing solid residue of the feed material falling from the outlet of said exposure region defining means.

6. Apparatus to according to claim 1 including means for recirculating said surface presenting bodies from the outlet of said exposure region defining means to the inlet thereof.

* * * * *

UNITED STATES PATENT AND TRADEMARK OFFICE
CERTIFICATE OF CORRECTION

PATENT NO.    : 5,470,544  
DATED         : November 28, 1995  
INVENTOR(S)   : Terry R. Galloway It is certified that error appears in the above-identified patent and that said Letters Patent is hereby corrected as shown below:

Drawings,
Figure 5, uppermost reference "77" should read --78 --.

Column 14,
Line 47, "steam" should read -- stream --.
Line 48, insert -- are -- between "which" and "separated".

Signed and Sealed this

Second Day of May, 2006

JON W. DUDAS  
*Director of the United States Patent and Trademark Office*